(12) United States Patent  (10) Patent No.: US 8,944,808 B2
Jacovich et al.  (45) Date of Patent: Feb. 3, 2015

(54) MOLDING APPARATUS (75) Inventors: William James Andrew Jacovich, Newmarket (CA); Renato Papa, Scarborough (CA); Derek Robertson McCready, Mississauga (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 50 days.

(21) Appl. No.: 13/880,827

(22) PCT Filed: Sep. 22, 2011

(86) PCT No.: PCT/CA2011/050585
§ 371 (c)(1),
(2), (4) Date: Apr. 22, 2013

(87) PCT Pub. No.: WO2012/055038
PCT Pub. Date: May 3, 2012

(65) Prior Publication Data
US 2013/0236590 A1   Sep. 12, 2013

Related U.S. Application Data

(60) Provisional application No. 61/407,493, filed on Oct. 28, 2010.

(51) Int. Cl.
*B29C 45/26* (2006.01)
*B29C 45/40* (2006.01)
(Continued)

(52) U.S. Cl.
CPC .............. *B29C 49/56* (2013.01); *B29C 45/17* (2013.01); *B29B 11/08* (2013.01); *B29B 11/14* (2013.01); *B29B 2911/1402* (2013.01); *B29B 2911/14026* (2013.01); *B29B 2911/14033* (2013.01); *B29B 2911/1404* (2013.01); *B29B 2911/14106* (2013.01); *B29B 2911/14133* (2013.01); *B29B 2911/14326* (2013.01);
(Continued)

(58) Field of Classification Search
USPC .................................................. 425/556, 577
See application file for complete search history.

(56) References Cited

U.S. PATENT DOCUMENTS 6,488,881 B2   12/2002   Gellert
7,128,865 B2   10/2006   Martin
(Continued)

FOREIGN PATENT DOCUMENTS

CA    2406915 A1    11/2001
CA    2739906 A1    5/2010

OTHER PUBLICATIONS

PCT International Search Report, Pengfei Zhang, 3 pages, Nov. 14, 2011.

*Primary Examiner* — Robert B Davis (57) ABSTRACT

Disclosed herein are, amongst other things, a molding apparatus with which to mold, in use, a preform of a type for blow molding into a container. The molding apparatus includes a lock ring (104, 204) for use in a first stack portion (108) of a mold stack (120). The lock ring (104, 204) includes a tubular body (150, 250) that is configured to define, amongst other things, a support interface (194) in cooperation, in use, with a split insert (6, 106) of the first stack portion through which a compressive load is transferrable during molding of the preform, wherein the support interface (194) includes a support shelf (154) that is defined, at least in part, on a first major promontory (152, 252) of the tubular body (150, 250).

19 Claims, 4 Drawing Sheets

(51) Int. Cl.
  *B29C 45/43*   (2006.01)
  *B29B 11/08*   (2006.01)
  *B29C 49/56*   (2006.01)
  *B29C 45/17*   (2006.01)
  *B29B 11/14*   (2006.01)
  *B29C 45/33*   (2006.01)
  *B29K 105/00*  (2006.01)

(52) U.S. Cl.
  CPC ............... *B29B 2911/14333* (2013.01); *B29B 2911/1444* (2013.01); *B29C 45/2612* (2013.01); *B29C 45/43* (2013.01); *B29C 45/33* (2013.01); *B29K 2105/253* (2013.01)

USPC .......................................... 425/556; 425/577

(56) References Cited

U.S. PATENT DOCUMENTS

| | | |
|---|---|---|
| 7,381,049 B2 | 6/2008 | Li et al. |
| 7,645,132 B2 | 1/2010 | McCready |
| 7,713,054 B2 | 5/2010 | Mai |
| 2004/0101588 A1* | 5/2004 | Coel et al. ................ 425/556 |
| 2006/0180954 A1* | 8/2006 | Manera et al. ............ 425/556 |
| 2007/0148280 A1* | 6/2007 | Honisch et al. ........... 425/577 |
| 2009/0220809 A1* | 9/2009 | Bertheol et al. .......... 428/542.8 |

* cited by examiner

FIG. 4

MOLDING APPARATUS

TECHNICAL FIELD

Embodiments of the present invention generally relate to a molding apparatus for molding a preform of the type for blow molding into a container, and more particularly to a lock ring for use in a mold stack.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

As an illustration, injection molding of PET material involves heating the PET material (or other suitable molding material for that matter) to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the molding cavity. When cooled, the molded article shrinks inside of the molding cavity and, as such, when the cavity and core plates are urged apart, the molded article tends to remain associated with the core piece. Accordingly, by urging the core plate away from the cavity plate, the molded article can be subsequently demolded by ejecting it off the core piece.

Figure 1:
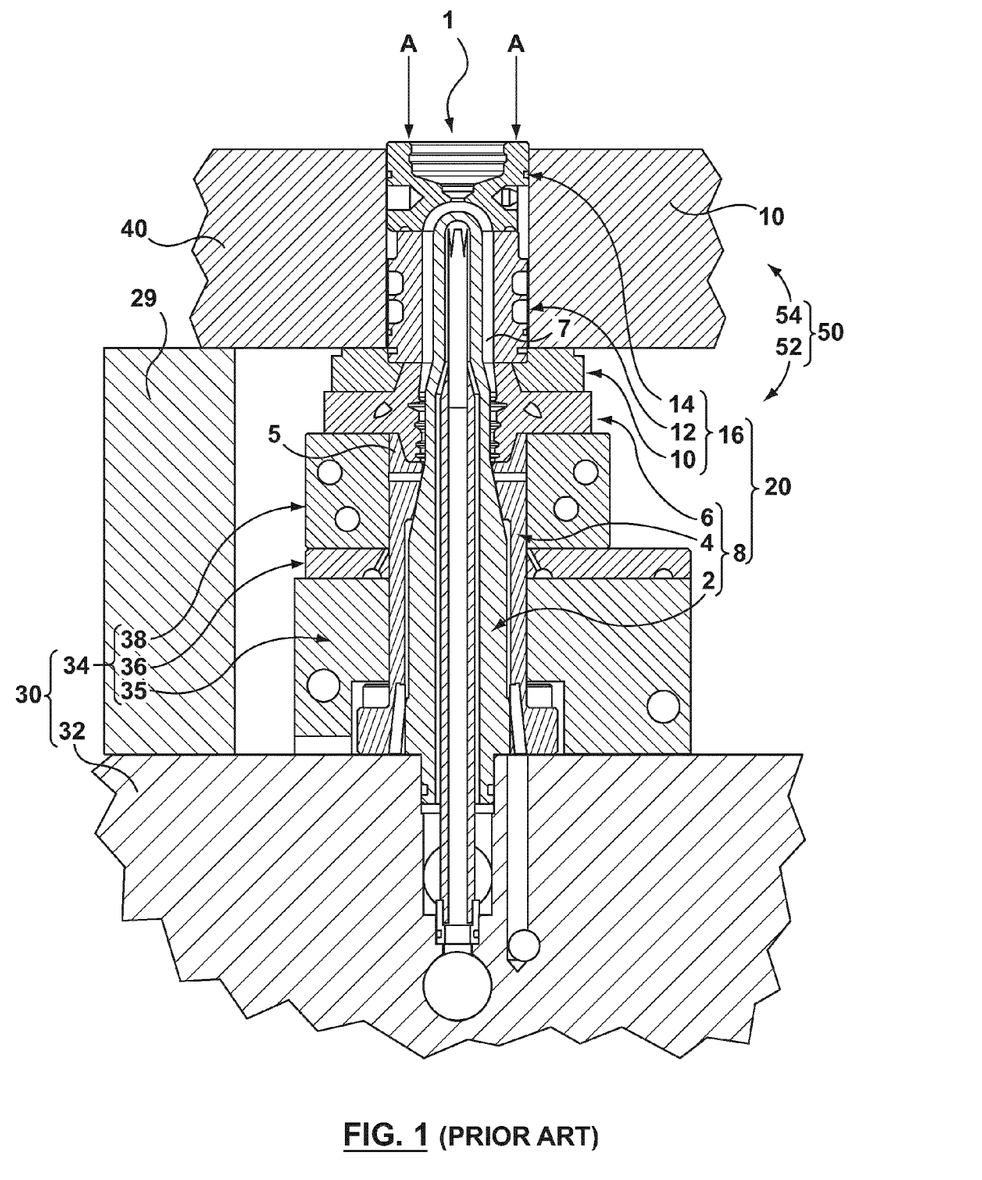
FIG. 1 depicts a section view through a prior art embodiment of an injection mold.

FIG. 1 is a cross-sectional view through a portion of a typical injection mold 50 that has been reproduced from U.S. Pat. No. 7,381,049 to LI, Guoming, published on Jun. 3, 2008. The description of the injection mold 50 that follows will be greatly simplified, as it is expected that one skilled in the art will readily appreciate the structure and operation thereof.

The injection mold 50 includes a first mold portion 52 and a second mold portion 54 that are shown clamped together to define a molding cavity 7 therebetween within which a molded article, such as a preform of the type for blow molding into a container, is moldable. More particularly, the molding cavity 7 is definable between a first stack portion 8 and a second stack portion 16 of a mold stack 20 that are associated with a first mold shoe 30 and a second mold shoe 40 of the first mold portion 30 and a second mold portion 40, respectively.

The first stack portion 20 broadly includes a core insert 2, a lock ring 4, and a split insert 6 that are structured to define an inner body portion, a top portion and an encapsulated portion (e.g. for molding the neck region on the preform/ container) of the molding cavity 7, respectively.

The first mold shoe 30 broadly includes a core plate 32 and a stripper assembly 34. The core insert 2 and the lock ring 4 are associated with the core plate 32, whereas the split mold insert 6 is associated with the stripper assembly 34. The lock ring 4 is structured to both retain the core insert 20 to the core plate 3 and to align and hold closed (i.e. keep the halves thereof in a closed configuration) the split mold insert 6 during a step of molding of the molded article. The stripper assembly 34 includes a stripper plate 35, a wear plate 36, and a pair of slides 38. The stripper plate 35 is operatively coupled to a stripper plate actuator, which is not depicted, but is well-known to those of skill in the art (for example, a hydraulic actuator, a servo-motor actuator and the like). The stripper plate actuator (not depicted) is configured to move the stripper plate, back and forth, along a longitudinal axis of the mold stack 20.

For the performance of a molded article ejection function, the halves of the split mold insert 6 are operatively coupled to a respective one of the pair of slides 38 by suitable means, such as bolts (not depicted), for movement therewith as will be described momentarily. The pair of slides 38 are coupled to slide actuators (not depicted), which can be implemented as cam(s), servo motor(s) and the like. The slide actuators are configured to move the pair of slides 38, back and forth, in a direction which is substantially perpendicular to a longitudinal axis of the mold stack 20. The wear plate 36 is provided between the stripper plate 35 and the pair of slides 38 to prevent substantial damage to the stripper plate 35 and/or pair of slides 38 during the movement of the pair of slides 38 relative to the stripper plate 35. The wear plate 36 is implemented according to known techniques and is coupled to the stripper plate 35 by suitable couplers, such as bolts (not depicted) and the like.

Turning attention briefly to the second mold portion 16, it may be appreciated that the second stack portion 16 broadly includes a cavity insert 12, a cavity mounting flange 10 and a gate insert 14. The cavity insert 12 and the gate insert 14 define an outer body portion of the molding cavity 7. The gate insert 60 is further configured to connect the molding cavity 7 to a melt distribution system (not shown). The cavity mounting flange 10 is configured to retain the cavity insert 14 to the second mold shoe 40 and to align and hold closed the split mold insert pair 40 during the step of molding.

In the quest for ever more efficient and productive molding system productivity, a common approach is to maximize a density of mold stacks within the injection mold. To do this, the mold stacks are generally designed to take as little space as possible, and as a consequence often experience, in use, stresses and strains that approach, and sometimes exceed, the strength of the associated materials. As such, many injection molds further incorporate one or more tonnage blocks 29 in between confronting faces of the first mold shoe 30 and the second mold shoe 40 through which excess clamping force may be channeled around the mold stacks, including the mold stack 20, and thus avoid damaging (i.e. crushing) weaker portions thereof—such as, for example, an annular top portion 5 of the lock ring 4.

Other examples of known injection molds may be referenced in any one of the publications that follow, including U.S. Pat. No. 7,645,132 to MCCREADY, Derek, published on Jan. 12, 2010, discloses a mold stack of a molding machine. A cavity insert is provided. The cavity insert comprises a body having: an internal surface defining, in use, at least a body portion of a molding cavity; an external surface defining, in use, at least a first portion of a cooling channel configured, in use, to direct a flow of coolant; and a mounting flange configured to support, in use, the body relative to a front face of a cavity plate, the mounting flange including a member configured to define, in use, a second portion of the cooling channel.

U.S. Pat. No. 7,128,865 to MAI, Arnold, published on May 11, 2010, discloses a split mold insert and a mold stack incorporating same. The split mold insert for defining, at least partially, a neck area of a preform suitable for blow molding into a final-shaped article, in particular, is provided. The split mold insert comprises a body having (i) a cavity defining portion for defining, in use, a portion of the neck area and (ii) a top promontory and a bottom promontory located at opposite sides of the body; a first female taper portion associated with the top promontory; a second female taper portion associated with the bottom promontory; the first female taper portion and the second female taper portion for cooperating, in use, with a first male taper of a first mold component and a second male taper of a second mold component, respectively, for aligning the body into an operational configuration.

PCT patent application publication 2010/051620 to MAI, Arnold et al., published on May 14, 2010, discloses a tonnage regulating structure and a mold incorporating same. For example, a tonnage regulating structure for use in a mold of a molding machine, the mold being associated with an opening clearance between mold faces in a mold closed and clamped configuration, is provided. The tonnage regulating structure comprises a body having a first height in a resting configuration, the first height selected to be larger than the opening clearance between the mold faces in a mold closed and clamped configuration; the body including a compensating structure, the compensating structure for regulating, in use under applied clamp tonnage, the body to a second height, the second height being smaller than the first height.

SUMMARY OF THE INVENTION

According to an aspect disclosed herein, there is provided a molding apparatus with which to mold, in use, a preform of a type for blow molding into a container. The molding apparatus includes a lock ring for use in a first stack portion of a mold stack. The lock ring includes a tubular body that is configured to define, amongst other things, a support interface in cooperation, in use, with the with a split insert of the first stack portion through which a compressive load is transferrable during molding of the preform, wherein the support interface includes a support shelf that is defined, at least in part, on a first major promontory on the tubular body.

According to another aspect disclosed herein, there is provided a molding apparatus with which to mold, in use, a preform of a type for blow molding into a container. The molding apparatus includes a lock ring for use in a mold stack with which to mold, in use, a preform of a type for blow molding into a container. The lock ring includes a tubular body that is configured to define a top portion of a molding cavity and a support flange near an upper end thereof. The support flange itself is configured to define a support shelf with which to support, in use, a bottom face of a split insert of the mold stack.

These and other aspects and features of non-limiting embodiments of the present invention will now become apparent to those skilled in the art upon review of the following description of specific non-limiting embodiments of the invention in conjunction with the accompanying drawings.

BRIEF DESCRIPTION OF THE DRAWINGS

The invention and its embodiments will be more fully appreciated by reference to the following detailed description of illustrative (non-limiting) embodiments in accordance with the present invention when taken in conjunction with the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE PREFERRED EMBODIMENT(S)

In the detailed description that follows, numerous specific details are set forth in order to provide a thorough understanding of several non-limiting embodiments of an injection mold having an in-mold molded article conveyance device. However, it will be recognized by one of ordinary skill in the art that the injection mold may be practiced without these specific details. In other instances, well known methods, procedures, and components have not been described in detail as not to unnecessarily obscure aspects of the present invention.

Figure 2:
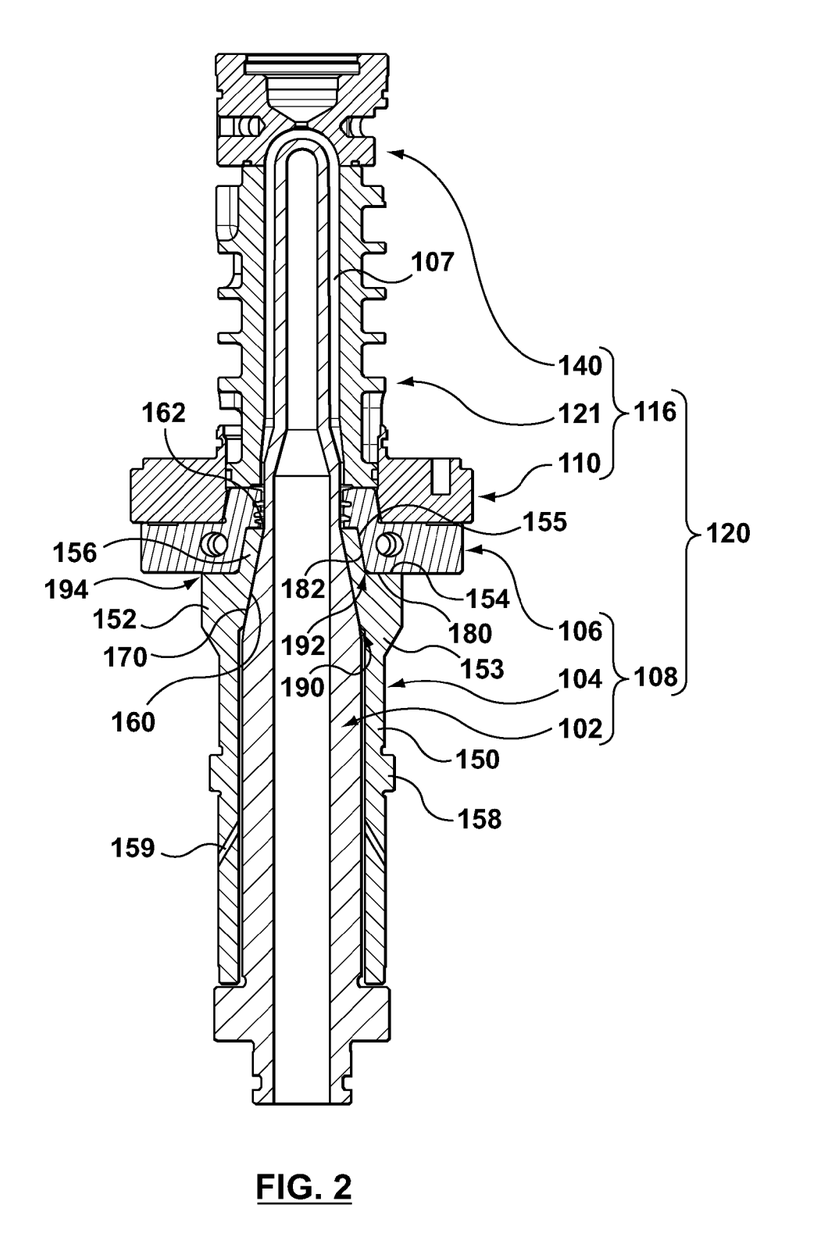
FIG. 2 depicts a section view through a non-limiting embodiment of a mold stack for use in an injection mold.

With reference to FIG. 2 there is depicted a section view through a first non-limiting embodiment of a mold stack 120 for use in an injection mold (not shown). The mold stack 120 includes a first stack portion 108 and a second stack portion 116 that are depicted in a molding configuration for defining a molding cavity 107 therebetween within which a molded article, such as the preform of the type for blow molding into a container, is moldable.

While not shown, the first stack portion 108 and the second stack portion 116 may be associated, in use, with a first mold portion (not shown) and a second mold portion (not shown) of the injection mold (not shown) in a manner that is similar to the way in which the first stack portion 8 and the second stack portion 16 were associated with the first mold portion 52 and the second mold portion 54, as depicted with reference to FIG. 1 and described previously.

Like the first stack portion 8, the first stack portion 108 broadly includes a core insert 102, a lock ring 104, and a split insert 106 that are structured to define an inner body portion, a top portion and an encapsulated portion (e.g. for molding the neck region on the preform/container) of the molding cavity 107, respectively. The structure and operation of the core insert 102, lock ring 104, and split insert 106 are generally consistent that of other such components that are known to those of skill in the art, such as, for example, the core insert 2, lock ring 4, and split insert 6, as depicted with reference to FIG. 1 and described previously. As such, in the description that follows, much of the constructional and operational details that would be known to those of skill in the art have been omitted.

The lock ring 104 includes a tubular body 150 that is configured to define a first aligning interface 190, a second aligning interface 192 and a support interface 194 in cooperation with the core insert 102 and the split insert 106.

The first aligning interface 190 may be defined, as shown, between the lock ring 104 and the core insert 102 when the lock ring 104 is positioned into contact with the core insert 102, during molding of the preform, for ensuring mutual alignment thereof. More particularly, with the core insert 102 being received within the tubular body 150 of the lock ring 104, in use, the first aligning interface 190 is provided between an inner conical face 160 that is defined on the tubular body 150 near an upper end thereof that is in contact with an outer conical face 170 on the core insert 102.

Likewise, the second aligning interface 192 may be defined between the lock ring 104 and the split insert 106 when the halves of the split insert 106 are positioned into a molding configuration (i.e. the halves thereof having been brought together), and in so doing engage the lock ring 104, for ensuring mutual alignment thereof. More particularly, with engagement between the split insert 106 and the lock ring 104, in use, the second aligning interface 192 is provided between a conical taper 155 that is defined on a conical projection at the upper end of the tubular body 150 that is contact with a complementary conical taper 182 that is defined in a bottom portion of the split insert 106.

Similarly, the support interface 194 may be defined between the lock ring 104 and the split insert 106, when the halves of the split insert 106 are positioned into a molding configuration, through which a compressive load (i.e. axial clamping load that is applied to the injection mold to keep it closed during the molding steps of injection, hold and cooling—these steps being familiar to those of skill in the art) is transferrable during molding of the preform. More particularly, the tubular body 150 includes a first 'promontory' 152 (i.e. a lateral projecting portion that juts out from a side of the tubular body 150), and wherein a top face of the first major promontory provides a support shelf 154 that is configured to support a bottom face 180 of the split insert 106. Accordingly, the support interface 194 is provided between the support shelf 154 and the bottom face 180 of the split insert 106.

A technical effect of the support interface 194 may include a mold stack that is both compact and structurally resilient to axially applied compressive loads (i.e. clamping force that is directed substantially along a longitudinal axis of the mold stack 120), whereby a plurality of such mold stacks may be arranged in a dense array in the injection mold without necessarily having to incorporate tonnage blocks therein (although such incorporation is not excluded).

Figure 3:
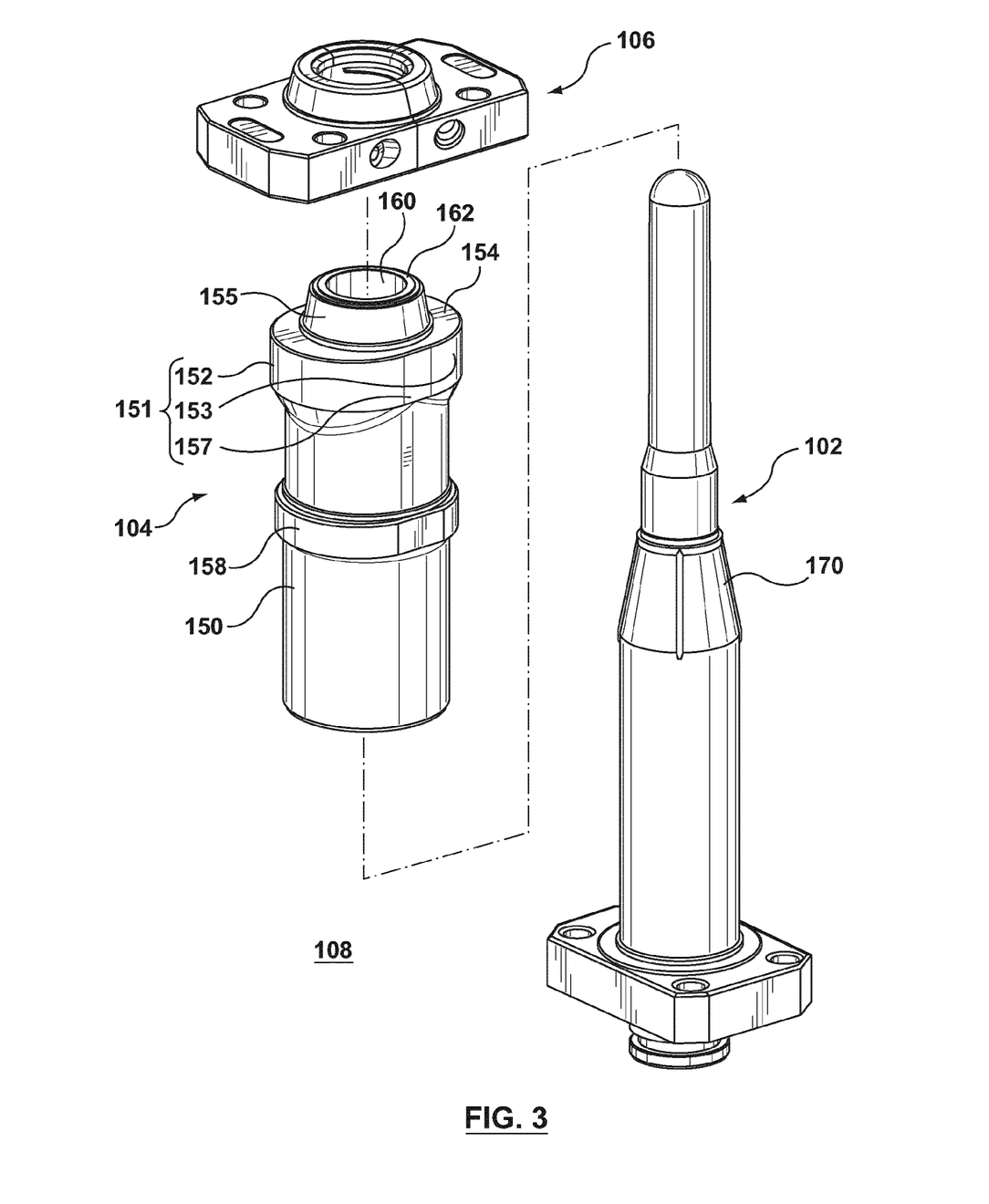
FIG. 3 depicts an exploded perspective view of a first stack portion of the mold stack of FIG. 2.

With reference to FIG. 3 there is depicted an exploded perspective view of the non-limiting embodiment of the first stack portion 108 that most clearly reveals the non-limiting embodiment of the support shelf 154. From this view it may be appreciated that the support shelf 154 may be further defined on a top face of a second major promontory 153 as well on top faces of a pair of minor promontories 157 (one of which is hidden from view) that span between the first major promontory 152 and the second major promontory 153. Of further note, the minor promontories 157 are relatively narrow in contrast to the first major promontory 152 and the second major promontory 153. In this way, a spacing between adjacent mold stacks (not shown) within a row (not shown) of the dense array thereof may be kept tight. More particularly, the mold stacks are to be oriented, about the longitudinal axis thereof, such that minor promontories 157 of adjacent mold stacks are confronting one another such that they may be closely spaced (i.e. tightest possible pitch). In so doing the first major promontory 152 and second major promontory 153 are oriented at substantially right angles to the row (i.e. they extend into a relatively large space that is provided between rows that is needed to accommodate the opening and closing of the split inserts). In this way, the support shelf 154 is made necessarily narrow in the area between mold stacks, within each row, and wider in the area between rows for providing additional supporting area upon which the split inserts 106 may contact.

In the present non-limiting embodiment, the tubular body 150 includes a support flange 151 near an upper end thereof, and wherein portions of the support flange 151 provide the first major promontory 152, the second major promontory 153 and the minor promontories 157. The first major promontory 152 and the second major promontory 153 are provided on diametrically opposed parts of the support flange 151, whereas the pair of minor promontories 157 join ends of first major promontory 152 with ends of the second major promontory 153. The support flange 151 is configured such that outer faces of the first major promontory 152 and the second major promontory 153 have a substantially rounded shape, whereby portions of the support shelf 154 that are defined thereby have a substantially arcuate outer perimeter. Furthermore, the support flange 151 is configured such that an outer face of each of the minor promontories 157 has a substantially planar shape, whereby one or more portions of the support shelf 154 that are defined thereby have a substantially flat outer perimeter. Overall then, it can be said that the support shelf 154 has a substantially oval outer perimeter. That being said, no such limitation of the shape of the support shelf 154 is implied. For example, the support shelf 154 may have an alternative configuration wherein the perimeter thereof is rectangular in shape. Furthermore, there are no specific limitations on the number and placement of the major and minor promontories that are provided on the tubular body 150.

Several auxiliary details of the lock ring 104 will now be briefly described, starting with the provision of a medial flange 158 on a mid-portion of the tubular body 150 with which to assist in retaining the tubular body 150 to a stripper assembly (not shown) of the injection mold (not shown), such as the stripper assembly 34 of the injection mold 50 that was described previously. It is worthwhile noting that by associating the lock ring 104 with the stripper assembly, the lock ring 104 is rendered operable to assist with stripping of the preform from the core insert 2 (i.e. functions as a stripper ring) with relative movement between the stripper assembly 34 and a core plate (not shown) with which the core insert 102 is associated.

Another auxiliary feature of the tubular body 150 is an air channel 159 (FIG. 2) that is configured to direct a stream of air, in use, towards the preform during a stripping thereof. The air channel 159 is to be fluidly connected, in use, with an air supply channel (not shown) which is configured to provide a supply of fluid (such as air, foe example), which can be supplied at an operational pressure. The air channel 159 is configured to direct a stream of so-supplied air towards the preform during portions of the molding cycle. The stream of air is directed through a gap (not shown) that is provided between core insert 102 and the lock ring 104, when they are relatively repositioned into a stripping configuration (not shown), towards the preform and, specifically, the top sealing surface thereof. Generally speaking, this directed stream of air can perform one or more of the following functions: (i) assisting in stripping of the preform off the core insert 102; (ii) preventing vacuum build up/friction between the preform and the core insert 102; (iii) assisting in the transfer of the preform from the core insert 102 into a post-mold molded article handling device (not shown).

For sake of completeness, referring back to FIG. 2, it may also be appreciated that the mold stack 120 also includes the second stack portion 116 with which to define an outer portion of the molding cavity 107. The second stack portion 116 broadly includes a cavity insert 121, a cavity mounting flange 110 and a gate insert 114. These components of the second stack portion 116 are similar enough to the similarly named counterparts in the injection mold 50 (FIG. 1) that any further description thereof is unwarranted and thus omitted.

Figure 4:
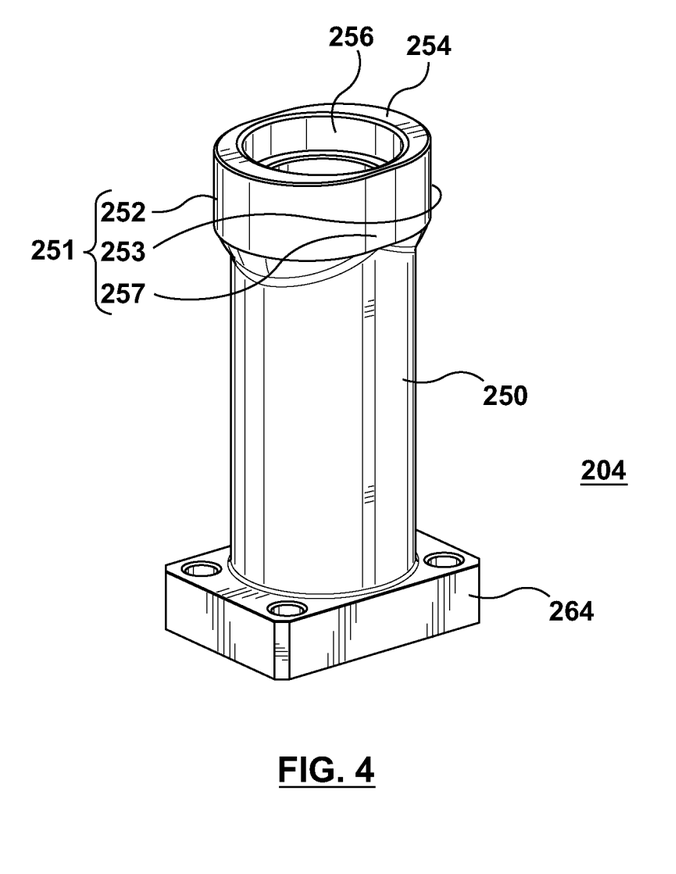
FIG. 4 depicts a perspective view of a non-limiting embodiment of a lock ring for use in a mold stack within the injection mold of FIG. 1.

Turning now to FIG. 4, there is depicted a perspective view through another non-limiting embodiment of a lock ring 204 that is suitable for retrofit use in the injection mold 50 (FIG. 1) described previously, and thus replaces the lock ring 4 (FIG. 1).

The lock ring 204 is substantially identical to the lock ring 4 (FIG. 1), described previously, with the exception that tubular body 250 thereof has been modified to include a support flange 251 that is configured to define a support interface in cooperation with the split insert 6 (FIG. 1) in a manner that is analogous to the support interface 194 (FIG. 2) described previously.

More particularly, a first major promontory 252, a second major promontory 253 and a pair of minor promontories 257 are all provided along portions of a single support flange 251 that is provided on the tubular body 250 near an upper end thereof upon which is defined a support face 254 for supporting a bottom face (not shown) of the split insert 6 (FIG. 1). The first major promontory 252 and the second major promontory 253 are provided on diametrically opposed parts of the support flange 251, whereas the pair of minor promontories 257 joins ends of first major promontory 252 with ends of the second major promontory 253. Recalling that the support flange 251 on the tubular body 250 is similar to that on the tubular body 150 (FIG. 3), as described previously, a repeated description of the various non-limiting attributes of the support flange have been omitted.

For sake of completeness, several auxiliary details of the lock ring 104 will now be briefly described, starting with the provision of a conical taper 256 that is defined in an upper end of the tubular body 250 with which to cooperate, during molding of the preform, with a complementary conical taper that projects from a bottom portion of the split insert 6 (FIG. 1).

Furthermore, the tubular body 250 may further include a base flange 264 with which to assist in retaining the tubular body 150 to the core plate 32 (FIG. 1) of a first mold shoe 30 (FIG. 1), whereby the lock ring 204 is configured to retain the core insert 2 (FIG. 1) to the core plate 32 (FIG. 1).

It is noted that the foregoing has outlined some of the more pertinent non-limiting embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. This includes the mixing and matching of features, elements and/or functions between various embodiments is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above.

What is claimed is:

1. A molding apparatus with which to mold, in use, a preform of a type for blow molding into a container, the molding apparatus comprising:

a lock ring for use in a first stack portion of a mold stack wherein the lock ring includes a tubular body that is configured to define a support interface in cooperation, in use, with a split insert (6, 106) of the first stack portion that is engageable therewith through which a compressive load is transferrable during molding of the preform, and wherein the support interface includes a support shelf that is defined, at least in part, on a first major promontory that juts out from a side of the tubular body for supporting a bottom face of the split insert (6, 106) the support shelf is further defined by a pair of minor promontories that span between the first major promontory and the second major promontory, wherein the pair of minor promontories are relatively narrow in contrast to the first major promontory and the second major promontory.

2. The molding apparatus according to claim 1, wherein:
the tubular body is configured to define a top portion of a molding cavity.

3. The molding apparatus according to claim 1, wherein:
the support shelf is further defined on a second major promontory that juts out from a side of the tubular body.

4. The molding apparatus according to claim 1, wherein:
outer faces of the first major promontory and the second major promontory have a substantially rounded shape, whereby portions of the support shelf that are defined thereby have a substantially arcuate outer perimeter.

5. The molding apparatus according to claim 4, wherein:
an outer face of the pair of minor promontories have a substantially planar shape, whereby one or more portions of the support shelf that are defined thereby have a substantially flat outer perimeter.

6. The molding apparatus according to claim 5, wherein:
the tubular body includes a support flange near an upper end thereof, wherein the first major promontory and the second major promontory are provided on diametrically opposed parts thereof, and wherein the pair of minor promontories that are also provided by the support flange include a pair thereof with which to join ends of first major promontory with ends of the second major promontory, whereby the support shelf has a substantially oval outer perimeter.

7. The molding apparatus according to claim 2, wherein:
the tubular body is further configured to define:
a first aligning interface in cooperation, in use, with a core insert (2, 102) of the first stack portion that is receivable within the tubular body for providing mutual alignment thereof during molding of the preform;
a second aligning interface in cooperation, in use, with the split insert (6, 106) for providing the mutual alignment thereof during molding of the preform.

8. The molding apparatus according to claim 7, wherein:
the first aligning interface includes an inner conical face that is defined on the tubular body near an upper end thereof with which to cooperate, during molding of the preform, with an outer conical face on the core insert (2, 102).

9. The molding apparatus according to claim 8, wherein:
the tubular body further includes a conical projection at the upper end thereof, wherein the second aligning interface includes a conical taper thereof with which to cooperate, during molding of the preform, with a complementary conical taper that is defined in a bottom portion of the split insert.

10. The molding apparatus according to claim 7, wherein:
the tubular body further includes a medial flange thereon with which to assist in retaining the tubular body to a stripper assembly (34) of a first mold shoe (30), wherein the lock ring is operable to assist with stripping of the preform from the core insert (2) with relative movement between the stripper assembly (34) and a core plate (32) with which the core insert (2) is associated.

11. The molding apparatus according to claim 8, wherein:
the second aligning interface includes a conical taper that is defined in the upper end of the tubular body with which to cooperate, during molding of the perform, with a complementary conical taper that projects from a bottom portion of the split insert (6).

12. The molding apparatus according to claim 7, wherein:
the tubular body further includes a base flange thereon with which to assist in retaining the tubular body to a core plate (32) of a first mold shoe (30), whereby the lock ring further functions to retain the core insert (2) to the core plate (32).

13. The molding apparatus according to claim 7, wherein:
the tubular body further defines an air channel that is configured to direct a stream of air, in use, towards the preform during a stripping thereof.

14. The molding apparatus according to claim 7, further comprising:
the core insert (2, 102) and the split insert (6, 106) that are configured to define an inner body portion and an encapsulated portion of the molding cavity.

15. The molding apparatus according to claim 14, further comprising:
a second stack portion of the mold stack that is configured to define an outer portion of the molding cavity.

16. The molding apparatus according to claim 15, wherein:
the second stack portion of the mold stack includes a cavity insert and a gate insert that are configured to cooperate to define the outer portion of the molding cavity.

17. The molding apparatus according to claim 15, further comprising:
a first mold shoe (30) that is configured for mounting the first stack portion of the mold stack thereto;
a second mold shoe (40) that is configured for mounting the second stack portion of the mold stack thereto.

18. A lock ring for use in a mold stack that is configured to mold, in use, a preform of a type for blow molding into a container, the lock ring comprising:
a tubular body that is configured to define:
a top portion of a molding cavity; and
a support flange near an upper end thereof that defines a support shelf with which to support, in use, a bottom face of a split insert of the mold stack;
wherein the support flange has an oval shape.

19. The lock ring according to claim 18, wherein:
the tubular body is further configured to define:
an inner conical face near the upper end thereof with which to cooperate, during molding of the preform, with an outer conical face on a core insert (2, 102) of the mold stack; and
a conical taper at the upper end thereof with which to cooperate, during molding of the preform, with a complementary conical taper that is defined in a bottom portion of the split insert.

* * * * *